(12) United States Patent
Kepecs

(10) Patent No.: US 6,389,401 B1
(45) Date of Patent: May 14, 2002

(54) SYSTEM AND METHOD FOR INVERTED PROMOTIONS

(75) Inventor: Jonathan Kepecs, Woodside, CA (US)

(73) Assignee: Concept Shopping, Inc., Lisle, IL (US)

( * ) Notice: Subject to any disclaimer, the term of this patent is extended or adjusted under 35 U.S.C. 154(b) by 0 days.

(21) Appl. No.: 09/303,077

(22) Filed: Apr. 30, 1999

(51) Int. Cl.$^7$ .............................................. G06F 17/60
(52) U.S. Cl. .............................. 705/14; 705/26; 705/27
(58) Field of Search ............................. 705/26, 27, 14

(56) References Cited

U.S. PATENT DOCUMENTS

| | | | |
|---|---|---|---|
| 4,554,446 A | 11/1985 | Murphy et al. | 235/487 |
| 4,723,212 A | 2/1988 | Mindrum et al. | 364/401 |
| 4,817,043 A | 3/1989 | Brown | 364/518 |
| 4,825,045 A | 4/1989 | Humble | 235/383 |
| 4,882,675 A | 11/1989 | Nichtberger et al. | 364/401 |
| 4,910,672 A | 3/1990 | Off et al. | 364/405 |
| 4,982,346 A | 1/1991 | Girouard et al. | 364/550 |
| 5,039,848 A | 8/1991 | Stoken | 235/381 |
| 5,056,019 A | 10/1991 | Schultz et al. | 364/405 |
| 5,173,851 A | 12/1992 | Off et al. | 364/401 |
| 5,231,568 A | 7/1993 | Cohen et al. | 364/401 |
| 5,305,195 A | 4/1994 | Murphy | 364/401 |
| 5,373,440 A | 12/1994 | Cohen et al. | 364/410 |
| RE34,915 E | 4/1995 | Nichtberger et al. | 364/401 |
| 5,420,606 A | 5/1995 | Begum et al. | 345/156 |
| 5,459,306 A | 10/1995 | Stein et al. | 235/383 |
| 5,612,868 A | 3/1997 | Off et al. | 364/214 |
| 5,687,322 A | 11/1997 | Deaton et al. | 395/214 |
| 5,708,782 A | 1/1998 | Larson et al. | 395/214 |
| 5,710,886 A | 1/1998 | Christensen et al. | 395/214 |
| 5,832,457 A | 11/1998 | O'Brien et al. | 705/14 |
| 5,857,175 A | 1/1999 | Day et al. | 705/14 |
| 5,970,124 A | * 10/1999 | Csaszar et al. | 379/88.18 |
| 5,970,470 A | * 10/1999 | Walker et al. | 705/14 |
| 6,076,071 A | * 6/2000 | Freeny, Jr. | 705/26 |
| 6,115,693 A | * 9/2000 | McDonough et al. | 705/10 |
| 6,134,534 A | * 10/2000 | Walker et al. | 705/26 |
| 6,185,541 B1 | * 2/2001 | Scroggie et al. | 705/14 |

FOREIGN PATENT DOCUMENTS

| | | | | |
|---|---|---|---|---|
| JP | 407065242 A | * | 3/1995 | G07G/1/12 |
| JP | 408161635 A | * | 6/1996 | G07G/1/06 |
| WO | WO 92/14213 | | 8/1992 | G06F/15/21 |
| WO | WO 92/20030 | | 11/1992 | G06F/15/21 |
| WO | 93/16443 | * | 8/1993 | G06F/15/21 |
| WO | WO 94/09440 | | 4/1994 | G06F/15/16 |
| WO | WO 97/23838 | | 7/1997 | G06F/17/60 |
| WO | WO 97/30409 | | 8/1997 | G06F/17/60 |

OTHER PUBLICATIONS

"Banyan joins the vultures picking over the 3+, 3+ open corpse.", Computergram International, Nov. 5, 1992.*
"World's First Smart Card Frequent Flyer Scheme Debuts", Newbyte News Network, Sep. 1997.*
"Intellipost Launches BonusMail with 50,000 Charter Members", Byline: Business Editors/Computer Writers, Jun. 1997.*
Kremer, John; Mail Order Selling Made Easier, Ad–Lib Publications, 1983, p. 75–79.*

* cited by examiner

*Primary Examiner*—Vincent Millin
*Assistant Examiner*—Jagdish Patel
(74) *Attorney, Agent, or Firm*—Gary T. Aka

(57) ABSTRACT

A method of extending promotional discounts and special prices on items for sale to identified consumers. After the identification of a consumer by a unique identifier; a selected item is promoted with a discount or special price to the identified consumer. The discount or special price is granted upon a purchase of the item by the identified consumer prior to the withdrawal or termination of the promotion to the identified consumer. The withdrawal or termination of the promotion is held in abeyance upon an acknowledgment of the promotion by the identified consumer. In other words, the identified consumer must take specific action to prevent a promotional discount from being withdrawn. This inverted promotion provides for greater incentives for the consumer to provide information about his or her purchasing habits.

17 Claims, 2 Drawing Sheets

SYSTEM AND METHOD FOR INVERTED PROMOTIONS

BACKGROUND OF THE INVENTION

The present invention relates generally to discounting and promotion of goods and services to consumers, and, more particularly, to the electronic distribution of promotions, such as discounts, rebates and special prices for goods and services.

Heretofore, consumer discounts on specific goods or services have been in the form of physical tokens or coupons by which a consumer can obtain a discount on the price of a good or a service by redeeming the token or coupon. For instance, paper coupons are often distributed with newspapers, or by blanket mailing to residents of a neighborhood or region. More recent forms of coupon distribution have attempted to better target the potential purchasers of particular items. For example, coupons are printed on the back of store purchase receipts, such as those at supermarkets, so that the coupons target those who actively shop. Another form of coupon distribution targets the purchasers of particular items. When a sale of a particular item is entered on a Universal Product Code (UPC) reader at a store, such as a supermarket, a coupon for the same item or family of items may be created for the purchaser to ensure brand loyalty. Alternatively, the coupon may be for a competing brand to encourage "brand-switching."

Another promotion incentive to consumers is to offer special pricing on items. This is attractive to the retailer since the retailer can receive some economic benefit from the special pricing. Though the profit is less for the sale of the item, the retailer might receive repeat business from a satisfied customer. In the case of coupons, the retailer receives no direct economic benefit. The retailer is reimbursed the face value of a redeemed coupon plus a small fee to compensate for the costs of processing the coupon and for advancing the cash value on the coupon to the consumer.

Ideally, a database of all consumers would allow the precise targeting of advertisements, discounts, or special prices, being a form of advertisement, to individual consumers. The effectiveness of consumer targeting would be maximized so that promotion money is spent where it is effective and not spent when it is ineffective. To that end, producers and retailers have used emerging technologies to identify consumers and their purchasing interests. Hence, much of the modern promotion efforts have been directed as much toward gathering consumer information, as well as encouraging the purchase of specific items. Surveys using modern polling techniques have helped create such consumer databases, and computers have been used to correlate buying patterns of customers through store loyalty cards, for example. However, such consumer identification remains elusive and expensive, and the targeting of consumers remains difficult and costly.

Up to now, promotion efforts have required the consumer to take a specific action to enable his or her discounts on a product or service. For instance, the consumer is required to bring in a paper coupon for redemption. In a modern supermarket, the consumer must make a selection at a kiosk to enable his discount at the checkout counter. In contrast, the present invention inverts the promotion so as to invite more participation from the consumer. As a result, the consumer's response to the incentive contributes more consumer information.

SUMMARY OF THE INVENTION

The present invention provides for a method of extending promotional discounts on items for sale to consumers. The method includes identifying a consumer by a unique identifier; promoting a selected item with a discount or special price to the identified consumer; withdrawing the discount to the identified consumer; granting the discount or special price upon purchase of the item by the identified consumer prior to the withdrawing step; and holding the withdrawing step in abeyance upon an acknowledgment of the promoting step by the identified consumer. Stated differently, the identified consumer must take specific action to prevent a promotional discount from being withdrawn. By doing so, the present invention provides for greater incentives for the consumer to provide information about his or her purchasing habits.

DESCRIPTION OF THE SPECIFIC EMBODIMENTS

Figure 1:
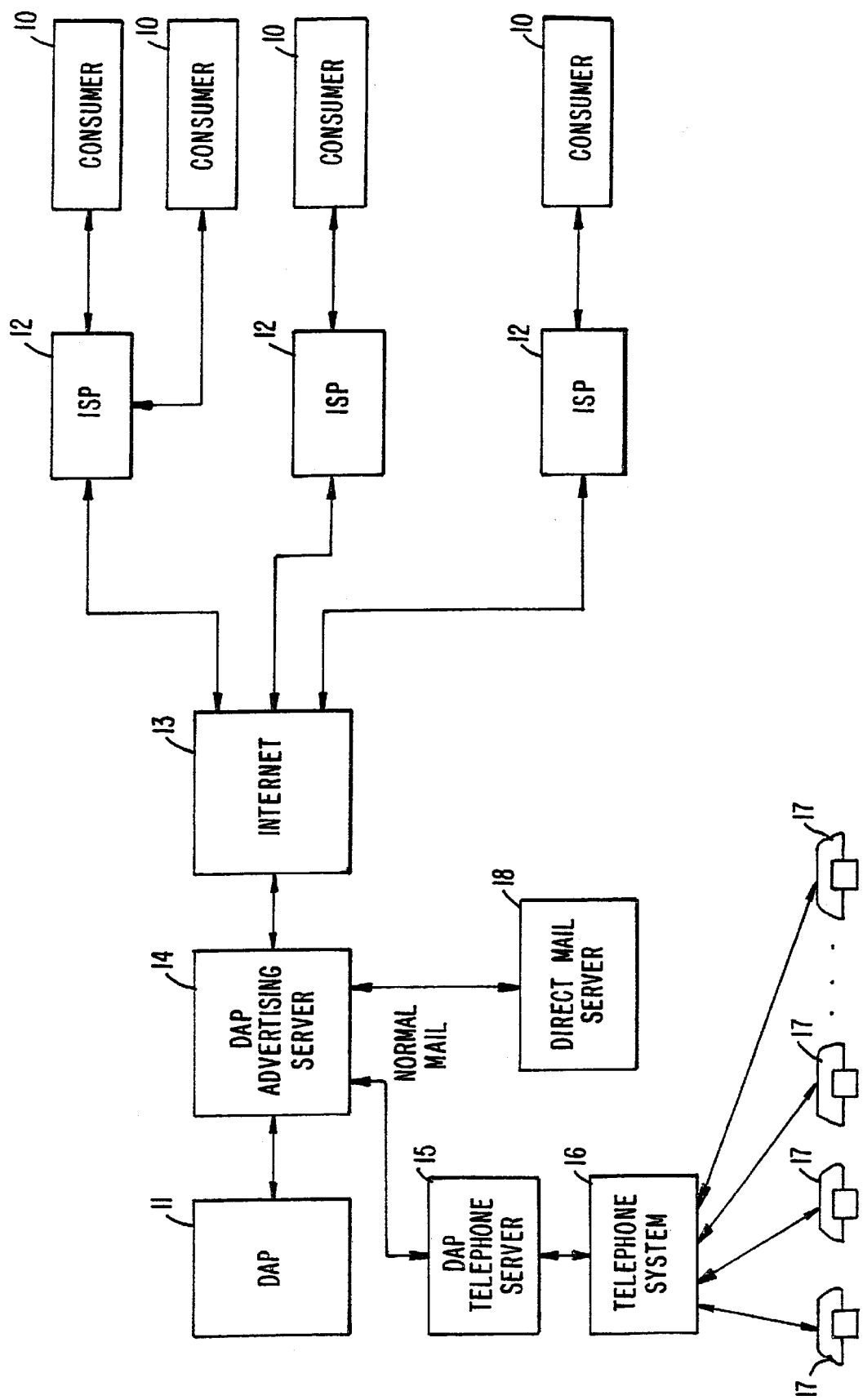
FIG. 1 is a block diagram of a computer network for providing promotional offers to consumers and receiving responses from them, according to the present invention.

The promotion, distribution of, and payment for, goods in a modern society are complex. Broadly stated, the producer manufactures the goods, the retailer sells the goods, and the consumer purchases the goods. There is often a financial institution which supplies credit, for example, through a credit card, or which administers some other non-cash payment system, for example, through a debit card or a so-called smart card, for the consumer to purchase the goods. To compete in the marketplace, the producer and the retailer employ advertising and promotions, including discounts, e.g., coupons, to encourage consumers to purchase their goods.

The effective targeting of consumers has become more urgent from the increased level of competition for customers today. This is especially true for the retailer which has been traditionally located near the consumer. Such retailers face mounting competition not only from other traditional retailers, but also from mail-order retailers and, more recently, the so-called "e-commerce" operators on the Internet, specifically the Worldwide Web.

The present invention provides for promotions in the context of unique consumer identifiers, some of which are in common use today. For example, a consumer's name and mailing address have been used as consumer identifiers for many years. Recently, retail stores, especially chains of retail stores, have started to offer loyalty cards which reward shoppers for frequenting the store(s) covered by the loyalty card. Stores generally request customer information (such as name and mailing address) and assign the customer a unique (to the store or chain) number for identification purposes. Besides loyalty card accounts, other consumer identifiers are account numbers for credit cards, debit cards, and smart cards. Even personal checks, telephone numbers, Social Security numbers and driver's license numbers provide unique identifiers of consumers. In the future, even biometric information may provide consumer identification.

It should noted that while the unique consumer identifiers above do effectively identify the person of the consumer, a unique consumer identifier, such as described in U.S. application Ser. No. 09/191,591, entitled "METHOD AND SYSTEM FOR DISTRIBUTING AND RECONCILING ELEC- TRONIC PROMOTIONS," and filed November, 1998 by Jonathan Kepecs and assigned to the present assignee, which application is hereby incorporated by reference, is also applicable to the present invention. That application describes a system by which an account number, termed the KEY, can be used to uniquely identify a consumer for purposes of creating a consumer database. The KEY may be isolated from other account numbers which can be used to identify the person of the consumer to preserve the person's privacy.

In any case, promotions are made with the expectation that more consumer information will be forthcoming in return for the discount. If a purchase of an item can be connected to a consumer, that transaction becomes part of the consumer's database. The present invention places the promotion in such terms so as to increase the likelihood of consumer participation and the addition of more consumer information by "inverting" the promotion. Rather than requiring the consumer to act upon the offered promotion to obtain the discount, the present invention inverts this process. The promotion discount may withdrawn unless the consumer acts.

The present invention is readily adaptable to traditional and more modern vehicles of promotion. The determination is first made to offer selected discounts, or more broadly stated, special prices, on one or more selected items to selected consumers. The determination can be made by human decision based upon analysis of broad consumer trends, or automatically by software which utilizes the consumer database for the identification of specific consumers, the costs of sales, inventory data, and other factors. If the entity making the promotion is a retailer, the other factors include any promotional incentives from manufacturers of the items. The results of the determination includes what items to promote, the timing of the promotion, the duration and conditions for the promotion. For example, there may be a limit of one item to a specific consumer. The promotion may expire after one week, or after one month if the targeted consumer buys no products related to the specific item. Note that with computer software, it is possible to make the promotion specific to each consumer.

The offer grants a discount upon purchase of the selected item by the selected consumer. A notice of the offer may be posted in a number of ways. The notification may be simply mailed to the selected customer by postal service. The notification may be sent by e-mail or simply posted on a webpage for, access by the selected consumer. Alternatively, the notification may be posted on a network with an automated telephone attendant to answer inquiries from consumers about such promotions.

Termination or withdrawal of the promotion might occur after a predetermined period or might be for any reason, or completely arbitrary. Note that unless the promotion is terminated, the consumer receives the benefits of the promotion anyway. If the consumer unknowingly purchases the selected item(s) before the offer is withdrawn, for instance, the discount or special price applies. The present invention may encourage the selected consumer to respond to the promotion so that more consumer information can be collected. Further encouragement for the consumer to be responsive to the notification of the promotion is created by notifying the unresponsive consumer of the termination or withdrawal of the promotion. The notification of the end of the promotion is transmitted at the time of the promotion termination. Typically the termination notification is sent by the same means as used for the transmission of the promotion notification, though another means might be used.

FIG. 1 illustrates an electronic promotion link which might be used to carry out the present invention. A computer 11 for a Discount Administration Process (DAP) holds the consumer database and the promotion discounts which have been determined. The DAP computer 11 is also the ultimate repository of the additional consumer information from the responses from the identified consumers to the inverted promotion. The DAP computer 11 is connected to a Discount Administration Process Advertising Server (DAPAS) 14 by which the consumers receive advertising and are provided with notices of the promotion discount(s). The notice informs the selected consumer that the discounts exist and that offer of the discounts may be terminated without some action on the part of the consumer. The DAP 11 and the DAPAS 14 may be operated by the entity offering the discounts or by a third party on behalf of one or more of such entities. One such example of a third party operator is described in the previously cited U.S. application Ser. No. 09/191,591.

The DAPAS 14 is connected to a direct mail server 18 which can be used to generate the direct mailings to the selected customer. An acknowledgment is required to identify the consumer to keep the promotion discount active. The return of a coupon with the name of the recipient is an example. Similarly, if the selected consumer responds to the automated telephone attendant, the response itself might be the required acknowledgment. Alternatively, an acceptance of the offer might be required. If the notice is accessible through a store kiosk, then the consumer's acknowledgment of the promotion is sufficient.

For electronic communication to the consumers, the DAPAS 14 is connected to the Internet. The consumers use their computers 10, which may be standard personal computers, the emerging so-called network computers, computer/TV devices designed specifically to operate over the Internet, such as WebTV or NetPC devices, or other data entry systems which permit two-way communication over the Internet (generally via e-mail or a web browser.), to access the Internet through a computer server 12 of an Internet service provider (ISP). The ISP server 12 is connected to the Internet, a network of computers, represented by an Internet computer 13. The DAPAS 14 can direct e-mail with a notice of the promotion to the selected consumer. A simple e-mail response from the consumer is an effective acknowledgment.

If the promotion is posted on a webpage by the DAPAS 14, then the consumer can browse through the promotions available to him or her at the website by his or her computer 10. Since each consumer logs in through an identifier, the target of the promotion is known. Besides being hosted on the DAPAS 14, the DAPAS 14 may interact with a remote Web host which in turn interacts with the consumer. If the consumer's identifier is created through a particular company's loyalty card program, the consumer can be directed to a website operated by that company, which in turn interacts with DAPAS 14. An acknowledgment by the selected consumer might be the act of browsing through the webpage or a positive response to accept the promotion offer might be required. In accordance with the present invention, any scheduled cancellation of the promotion is held in abeyance to allow the consumer to receive the benefits of the promotion in exchange for receiving the promotion.

The DAPAS 14 is also connected to a DAP telephone server 15, which operates as an automated telephone attendant. The server 15 is connected to the telephone system 16 and ordinary telephone sets 17 of the consumers. By calling in and identifying himself, a consumer can find out the promotions available to him through the server 15.

Figure 2:
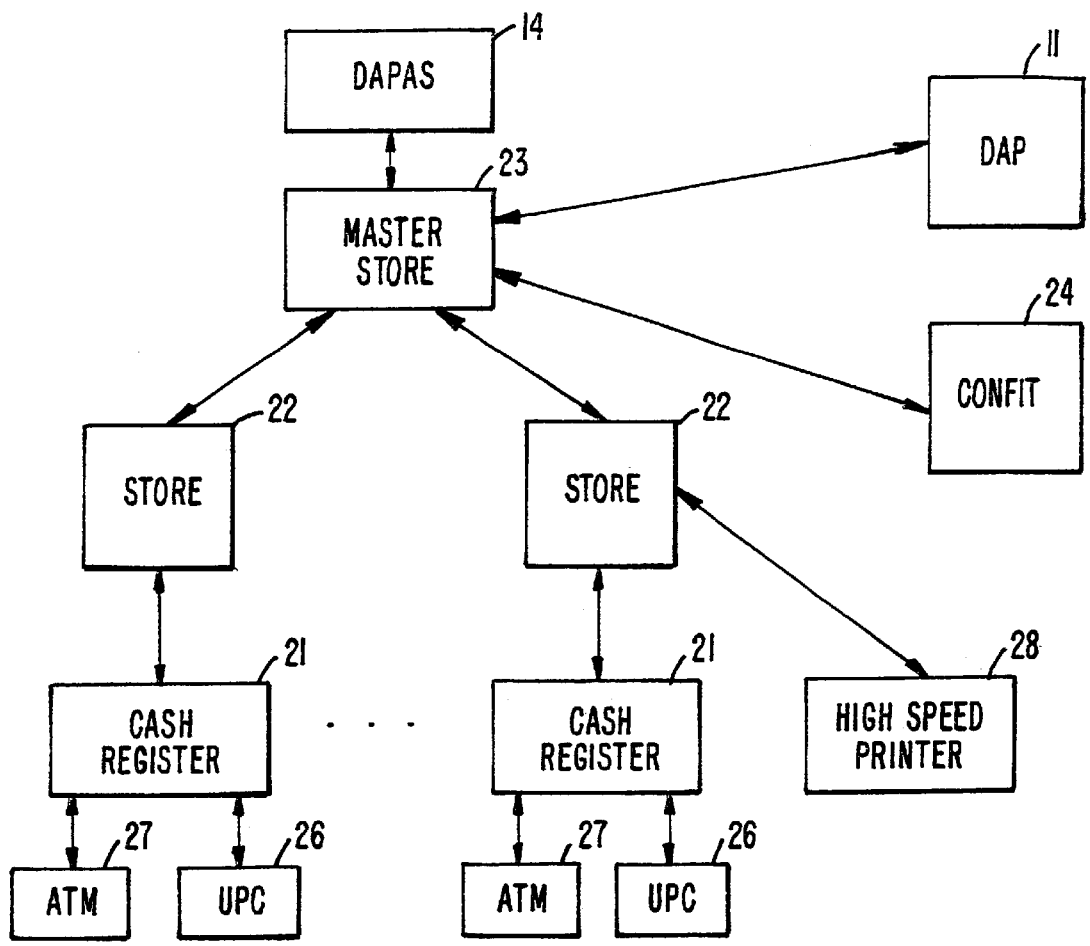
FIG. 2 is a block diagram of a representative retail computer network which can provide promotional offers to its customers in accordance with the present invention.

Finally, the notice might be posted on a retailer's network to which the consumer might access through a designated terminal, such as a kiosk, at one of the retailer's stores. FIG. 2 illustrates the general organization of the point-of-sale operation, i.e., a large store chain, for goods (and services). The store, e.g., a supermarket, typically operates with electronic cash registers 21, essentially computers which record each item sold, calculate the sales totals, prints the receipt, and so forth. Each cash register 21 is often connected to a Universal Product Code (UPC) scanner 26 and/or an Automated Teller Machine (ATM) reader 27. The UPC scanner 26 identifies bar codes on the products to the cash register 21. The ATM reader 27 reads the magnetically encoded account number of a credit/debit/smart card that has been issued by some financial institution, such as a bank, or a store-issued loyalty card, belonging to a consumer. Some cards may also encode their identification number as a bar code which is read by the UPC scanner. The ATM reader 27 also typically accepts typed-in, or otherwise entered, private information, such as a personal information number (PIN), to securely identify the card holder. The store loyalty cards, which are typically used to uniquely and anonymously identify their customers, are generally read by the UPC scanner 26 or possibly a magnetic code reader such as the ATM reader 27.

The cash registers 21 and the kiosk 28 are connected to a store computer 22, which maintains the centralized inventory, pricing and discount information of the store. In turn, the store computer 22 is connected via a network to a master store computer 23. The master store computer feeds pricing information to many store computers 22 and acts as a clearinghouse for a variety of distribution, inventory and other information used in store operations. In this network, the master store computer 23 might hold the consumer database and the promotion discounts which have been determined. The computer 23 is also the ultimate repository of/the additional consumer information from the responses from the identified consumers to the inverted promotion for the store. Alternatively, the store computers 22 might act for distributed or localized promotions. Of course, there can be multiple levels for store computers 22 depending upon the size of the retail operation. Naturally, nationwide store chains are likely to have many more computers and computer interconnections. Once the promotion discount is entered into the master store computer 23 or its equivalent, consumers may take their discounts on the specified products.

According to the present invention, the consumer may discover all the discounts available to him or her at the kiosk 28. Upon identification of the consumer, the kiosk displays the promoted discounts on a screen or simply prints them out for the consumer. Such might be sufficient to hold any cancellation of a discount in abeyance. Alternatively, the kiosk 28 might require some response from the consumer for a promoted discount before the cancellation is terminated.

Outside of the retail network, the master store computer 23 is connected to the computers 24 of financial institutions (FIT). The FIT computers 24 verify and process the financial transactions involving credit, debit and smart cards, including those at the store register 21. As explained above, these financial account numbers might be used for the consumer identifiers. Besides the connections to the FIT computers 24, the master store computer 23 is connected to a DAP computer 11 and its DAPAS 14. Besides the retailer's network, these connections provide several avenues of promotion and for the consumer to find out the available promotions.

While the foregoing is a complete description of the embodiments of the invention, it should be evident that various modifications, alternatives and equivalents may be made and used. Accordingly, the above description should not be taken as limiting the scope of the invention which is defined by the metes and bounds of the appended claims.

What is claimed is:

1. A method of extending promotional discounts on items for sale to consumers, comprising
    identifying a consumer by a unique identifier;
    promoting a selected item with a discount or special price to an identified consumer;
    withdrawing said discount or special price to said identified consumer;
    granting said discount upon purchase of said item by said identified consumer prior to said withdrawing step and independently of a response to said promoting step; and
    holding said withdrawing step in abeyance upon an acknowledgment of said promoting step by said identified consumer.

2. The method of claim 1 wherein said promoting step comprises e-mail transmission to said identified consumer.

3. The method of claim 1 wherein said promoting step comprises direct mail to said identified consumer.

4. The method of claim 1 wherein said promoting step comprises posting a notice of said discount for said selected item on a web page.

5. The method of claim 4 wherein said acknowledgment of said promoting step comprises browsing said web page.

6. The method of claim 1 wherein said promoting step comprises posting a notice of said discount for said selected item on a network accessible from a kiosk at a location selling said selected item.

7. The method of claim 6 wherein said acknowledgment of said promoting step comprises retrieving said notice at said kiosk.

8. The method of claim 1 wherein said promoting step comprises posting a notice of said discount for said selected item on a network accessible from at least one location selling said selected item.

9. The method of claim 8 wherein said acknowledgment of said promoting step comprises purchasing an unselected item at said at least one location and receiving a notice of said discount or special price for said selected item on a sales receipt of said purchase of said unselected item.

10. The method of claim 1 wherein said promoting step comprises posting a notice of said discount or special price for said selected item on a network accessible through an automated telephone attendant.

11. The method of claim 10 wherein said acknowledgment of said promoting step comprises calling said automated telephone attendant.

12. The method of claim 1 wherein said withdrawing step is performed after a predetermined time period after said promoting step.

13. The method of claim 1 further comprising notifying said consumer of said withdrawing step.

14. The method of claim 13 wherein said notifying step is performed when said withdrawing step is performed.

15. A method of extending promotional discounts on items for sale to consumers, comprising
    identifying a consumer by a unique identifier;
    promoting a selected item with a discount or special price to an identified consumer wherein said promoting step comprises posting a notice of said discount for said selected item on a network accessible from at least one location selling said selected item;
    withdrawing said discount or special price to said identified consumer;
    granting said discount upon purchase of said item by said identified consumer prior to said withdrawing step; and holding said withdrawing step in abeyance upon an acknowledgment of said promoting step by said identified consumer wherein said acknowledgment of said promoting step comprises purchasing an unselected item at said at least one location and receiving a notice of said discount or special price for said selected item on a sales receipt of said purchase of said unselected item.

16. A method of extending promotional discounts on items for sale to consumers, comprising identifying a consumer by a unique identifier;

promoting a selected item with a discount or special price to an identified consumer;

withdrawing said discount or special price to said identified consumer;

notifying said consumer of said withdrawing step;

granting said discount upon purchase of said item by said identified consumer prior to said withdrawing step; and holding said withdrawing step in abeyance upon an acknowledgment of said promoting step by said identified consumer.

17. The method of claim 16 wherein said notifying step is performed when said withdrawing step is performed.

* * * * *